US010772095B1

(12) United States Patent
Hanley et al.

(10) Patent No.: US 10,772,095 B1
(45) Date of Patent: Sep. 8, 2020

(54) OPTIMIZED UNICAST AND BROADCAST COMMUNICATION IN TSCH PRIMARY AND SECONDARY NETWORKS

(71) Applicant: Landis+Gyr Innovations, Inc., Alpharetta, GA (US)

(72) Inventors: James Patrick Hanley, Decatur, GA (US); Michael Sean Holcombe, Roswell, GA (US); Christopher Scott Hett, Smyrna, GA (US); Lawrence Harris, Duluth, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 0 days.

(21) Appl. No.: 16/359,490

(22) Filed: Mar. 20, 2019

(51) Int. Cl.
*G05B 19/418* (2006.01)
*H04L 5/00* (2006.01)
(Continued)

(52) U.S. Cl.
CPC .... *H04W 72/0446* (2013.01); *G05B 19/4185* (2013.01); *H04L 5/0005* (2013.01);
(Continued)

(58) Field of Classification Search
CPC .... G05B 19/4185–4186; H04J 1/02–20; H04J 3/02–26; H04J 2011/0096; H04L 5/001–26; H04L 7/004–10; H04L 12/2803–2838; H04L 2012/284–285; H04L 67/12–125; H04L 69/24–324; H04W 4/04; H04W 4/06–08; H04W 4/30–38; H04W 4/70; H04W 8/22–245; H04W 28/02–0226; H04W 28/10–14;
(Continued)

(56) References Cited

U.S. PATENT DOCUMENTS

| 10,548,085 | B2* | 1/2020 | Hanley | ............... | H04W 72/005 |
| 2013/0022084 | A1 | 1/2013 | Vasseur et al. | | |
| 2018/0132182 | A1 | 5/2018 | Hanley et al. | | |

OTHER PUBLICATIONS

"IEEE Standard for Low-Rate Wireless Personal Area Networks (WPANs)", Draft IEEE P802.15.4-REVc/D00-BTM, Oct. 5, 2015, 761 pages.

(Continued)

*Primary Examiner* — Timothy J Weidner
(74) *Attorney, Agent, or Firm* — Kilpatrick Townsend & Stockton LLP

(57) ABSTRACT

A method for transmitting unicast messages includes: obtaining, by a first node configured to communicate on a primary time-slotted channel hopping (TSCH) network, a media access control (MAC) address of a second node configured to communicate on the primary TSCH network; determining whether the first node and the second node are also configured to communicate on a secondary TSCH network; and in response to determining that the first node and the second node are also configured to communicate on the secondary TSCH network: offsetting transmission of a unicast message until a second portion of a timeslot for the primary TSCH network; synchronizing to a channel hopping sequence and frequency of the secondary TSCH network for the second node, and transmitting, by the first node, the unicast message to the second node on the secondary TSCH network during the second portion of the timeslot.

23 Claims, 9 Drawing Sheets

(51) Int. Cl.
*H04L 12/28* (2006.01)
*H04L 29/06* (2006.01)
*H04L 29/08* (2006.01)
*H04W 4/70* (2018.01)
*H04W 8/22* (2009.01)
*H04W 28/02* (2009.01)
*H04W 40/24* (2009.01)
*H04W 56/00* (2009.01)
*H04W 72/00* (2009.01)
*H04W 72/04* (2009.01)
*H04W 74/08* (2009.01)
*H04W 80/02* (2009.01)
*H04W 84/18* (2009.01)
*H04W 92/02* (2009.01)

(52) U.S. Cl.
CPC .......... *H04L 12/283* (2013.01); *H04L 67/12* (2013.01); *H04L 69/26* (2013.01); *H04W 4/70* (2018.02); *H04W 8/22* (2013.01); *H04W 28/021* (2013.01); *H04W 40/244* (2013.01); *H04W 56/001* (2013.01); *H04W 72/005* (2013.01); *H04W 72/0453* (2013.01); *H04W 74/0808* (2013.01); *H04L 2012/2841* (2013.01); *H04W 80/02* (2013.01); *H04W 84/18* (2013.01); *H04W 92/02* (2013.01); *Y02D 70/144* (2018.01); *Y04S 20/42* (2013.01); *Y04S 40/18* (2018.05)

(58) Field of Classification Search
CPC ......... H04W 40/005–38; H04W 56/005–0095; H04W 72/005–14; H04W 74/002–0891; H04W 80/02; H04W 84/005; H04W 84/18–22; H04W 88/02; H04W 88/04–12; H04W 92/02; H04W 92/04; H04W 92/10; H04W 92/12; H04W 92/16–22; Y02D 70/14–146; Y02D 70/20–26; Y04S 20/228; Y04S 20/42; Y04S 20/48; Y04S 40/16–18
See application file for complete search history.

(56) References Cited

OTHER PUBLICATIONS

International Patent Application No. PCT/US2020/022892, International Search Report and Written Opinion dated Jun. 8, 2020, 14 pages.

* cited by examiner

| | | | | | | | | | | | | | | | | |
|---|---|---|---|---|---|---|---|---|---|---|---|---|---|---|---|---|
| 188 | Time Slot 1 | Time Slot 2 | Time Slot 3 | Time Slot 4 | Time Slot 5 | Time Slot 6 | Time Slot 7 | Time Slot 8 | Time Slot 9 | Time Slot 10 | Time Slot 11 | Time Slot 12 | Time Slot 13 | Time Slot 14 | Time Slot 15 | Time Slot 16 |
| 186 | Chan. 4 | Chan. 6 | Chan. 3 | Chan. 5 | Chan. 7 | Chan. 4 | Chan. 6 | Chan. 3 | Chan. 5 | Chan. 7 | Chan. 4 | Chan. 6 | Chan. 3 | Chan. 5 | Chan. 7 | Chan. 4 |
| 183 | Chan. 2 | Chan. 8 | Chan. 4 | Chan. 10 | Chan. 6 | Chan. 2 | Chan. 8 | Chan. 4 | Chan. 10 | Chan. 6 | Chan. 2 | Chan. 8 | Chan. 4 | Chan. 10 | Chan. 6 | Chan. 2 |
| 181 | Chan. 2 | Chan. 2 | Chan. 2 | Chan. 2 | Chan. 8 | Chan. 8 | Chan. 8 | Chan. 8 | Chan. 4 | Chan. 4 | Chan. 4 | Chan. 4 | Chan. 10 | Chan. 10 | Chan. 10 | Chan. 10 |

FIG. 1B

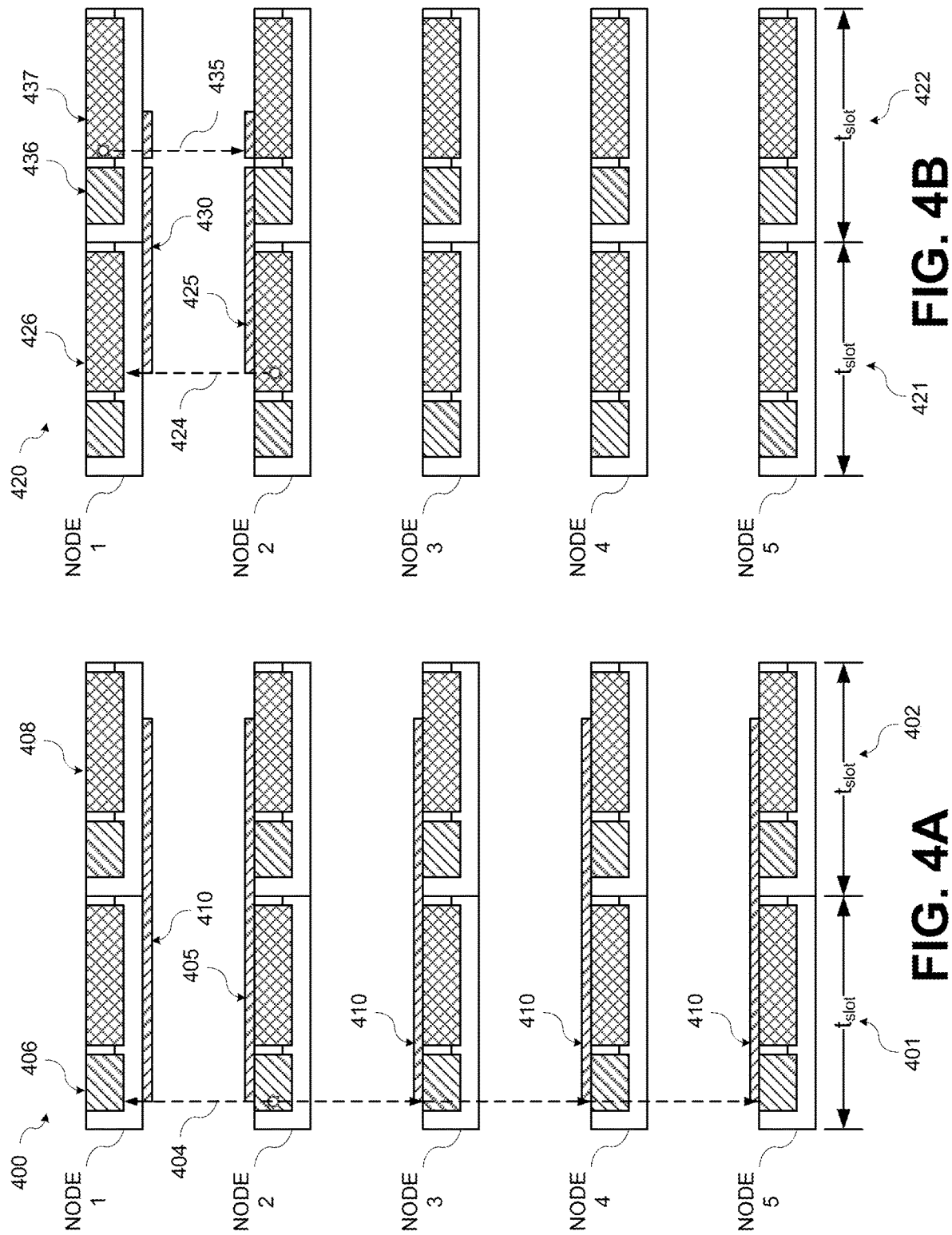

OPTIMIZED UNICAST AND BROADCAST COMMUNICATION IN TSCH PRIMARY AND SECONDARY NETWORKS

BACKGROUND

Unless otherwise indicated herein, the materials described in this section are not prior art to the claims in this application and are not admitted to be prior art by inclusion in this section.

A time-slotted channel hopping (TSCH) network, for example as defined by IEEE 802.15.4, can provide a communications network for resource providers (e.g., utility companies, home automation providers, industrial automation providers, etc. The resource providers may use the TSCH network to communicate between TSCH nodes (e.g., electric meters, routers, etc.), or endpoints (EPs), and low-energy (LE) devices, or LE endpoints (LEEPs), used to monitor or manage consumption of resources (e.g., electricity, heat, water, etc.). In some cases, LEEPs can be Internet-Of-Things (IoT) enabled devices that can be used in smart power grid and smart home technologies.

Currently in TSCH networks, there is a concept of "links" where there are, for example, guaranteed timeslots for nodes to transmit beacons for timeslot synchronization, and contention access period (CAP) timeslots for general communication of both unicast or broadcast messages. A unicast message is a message transmitted to one other node on the network. A multicast/broadcast message is a message transmitted to a group of nodes on the network. Although nodes use clear channel assessment (CCA) to validate that a channel is available, this only protects the channel from competing devices that are not time-synchronized, and as such does not inhibit nodes within the same personal area network (PAN) from interfering with each other's communication.

In the case of two (or more) nodes simultaneously transmitting frames, none will successfully transmit that frame. If those frames are unicast packets, there will be a media access control (MAC) layer retry that will retry in a random back-off period if the MAC layer acknowledgement from the destination node is not received. If one or more of the simultaneously transmitted frames is a broadcast frame, there is no logic to acknowledge the broadcast frame. Thus, the broadcast frame may never be received by other nodes and the transmitting node has no way of knowing if the frame was received by other nodes.

SUMMARY

Methods and systems for transmitting broadcast and unicast messages using primary and secondary networks are provided.

According to various aspects there is provided a method for transmitting unicast messages. In some aspects, the method may include: determining, by a first node, to transmit a unicast message to a second node; obtaining, by the first node configured to communicate on a primary time-slotted channel hopping (TSCH) network, a media access control (MAC) address of the second node configured to communicate on the primary TSCH network; determining whether the first node and the second node are also configured to communicate on a secondary TSCH network; and in response to determining that the first node and the second node are also configured to communicate on the secondary TSCH network: offsetting transmission of the unicast message until a second portion of a timeslot for the primary TSCH network; synchronizing to a channel hopping sequence and frequency of the secondary TSCH network for the second node, and transmitting, by the first node, the unicast message to the second node on the secondary TSCH network during the second portion of the timeslot.

The first node may offset transmission of the unicast message during the timeslot for a specified delay period. Offsetting transmission for the specified delay period may cause the first node to transmit the unicast message during the second portion of the timeslot when the second node is listening on the secondary TSCH network.

The specified delay period may be determined as a macTsTxOffset time period plus an additional macTsCCAOffset time period plus a macTsRxWait time period. The macTsTxOffset time period may be a period of time a sender node waits to transmit a frame to make communication possible when the sender node is ahead in time of a receiver node, the additional macTsCCAOffset time period may be a period of time to allow clear channel assessment after the macTsTxOffset time period, and the macTsRxWait time may be is a period of time the receiver node waits to start receiving the frame after the receiver node starts listening to a transmission medium. A primary portion of the timeslot may be prioritized for transmitting broadcast/multicast messages.

The MAC address of the second node may be associated with the channel hopping sequence of the second node on the secondary TSCH network, and the first node may determine the channel on the secondary TSCH network to transmit the unicast message to the second node based the channel hopping sequence associated with the MAC address of the second node contained in a neighbor table stored in a memory of the first node.

Prior to transmitting the unicast message to the second node, the first node may receive a communication from the second node over the primary TSCH network. The communication may contain a capability information element indicating that the second node supports communication over the secondary TSCH network.

A channel hopping protocol of the secondary TSCH network may switch frequencies less often than or at a same rate as a channel hopping protocol of the primary TSCH network switches frequencies.

In response to determining that the first node and the second node are only configured to communicate on the primary TSCH network, the unicast frame may be transmitted during a primary portion of the timeslot. The timeslot may be a contention access period timeslot for the primary TSCH network.

According to various aspects there is provided a time-slotted channel hopping (TSCH) network node. In some aspects, the TSCH network node may include: a transceiver, a memory, and a processor communicatively coupled to the transceiver and the memory. The processor may be configured to implement a protocol stack including a media access control (MAC) layer having a MAC address to communicate on a primary TSCH network. The MAC address may define addressing for the primary TSCH network and a secondary TSCH network.

The processor may be further configured to refer to a neighbor table stored in the memory of the TSCH network node to obtain the MAC address of a second TSCH network node. After a delay period of a first portion of a primary TSCH network timeslot the processor may cause the transceiver of the TSCH network node to: synchronize to a channel hopping sequence and frequency of the secondary TSCH network, and transmit a unicast frame to the second TSCH network node on the secondary TSCH network during a second portion of the primary TSCH network timeslot.

The processor may be configured to determine the delay period as a macTsTxOffset time period plus an additional macTsCCAOffset time period plus a macTsRxWait time period. The macTsTxOffset time period may be a period of time a sender node waits to transmit a frame to make communication possible when the sender node is ahead in time of a receiver node, the additional macTsCCAOffset time period may be a period of time to allow clear channel assessment after the macTsTxOffset time period, and the macTsRxWait time period may be a period of time the receiver node waits to start receiving the frame after the receiver node starts listening to a transmission medium.

The MAC address of the second TSCH network node may be associated with the channel hopping sequence of the second TSCH network node on the secondary TSCH network. The TSCH network node may determine the channel on the secondary TSCH network to transmit the unicast frame to the second TSCH network node based the channel hopping sequence associated with the MAC address of the second TSCH network node on the secondary TSCH network contained in the neighbor table stored in the memory of the TSCH network node.

Prior to transmitting the unicast frame to the second TSCH network node, a communication may be received from the second TSCH network node over the primary TSCH network. The communication may contain a capability information element indicating that the second TSCH network node supports communication over the secondary TSCH network. An indication corresponding to the capability information element may be stored in an entry associated with the second TSCH network node in the neighbor table in the memory of the TSCH network node.

The processor may also be configured to cause the transceiver to broadcast a communication over the primary TSCH network including a capability information element indicating that the TSCH network node supports communication over the secondary TSCH network.

According to various aspects there is provided a system in some aspects, the system may include: a plurality of timeslotted channel hopping (TSCH) nodes communicatively coupled to each other on a primary TSCH network. Each of the TSCH nodes may include a transceiver, a memory, and a processor communicatively coupled to the transceiver and the memory. The processor may be configured to implement a protocol stack including a media access control (MAC) layer having a MAC address to communicate on the primary TSCH network. The MAC address may define addressing for the primary TSCH network and a secondary TSCH network.

The processor of a first TSCH node of the plurality of TSCH nodes may be further configured to: cause the transceiver of the first TSCH node to receive a first communication from a second TSCH node of the plurality of TSCH nodes over the primary TSCH network containing a capability information element indicating that the second TSCH node supports communication over the secondary TSCH network, cause the transceiver of the first TSCH node to synchronize to a channel hopping sequence and frequency of the secondary TSCH network, and after a delay period of a first portion of a primary TSCH network timeslot, cause the transceiver of the first TSCH node to transmit a unicast frame to the second TSCH node on the secondary TSCH network during a second portion of the primary TSCH network timeslot. Delaying transmission for the delay period may cause the transceiver of the first TSCH node to transmit the unicast frame after a primary portion of the primary TSCH timeslot elapses.

The processor of each of the TSCH nodes of the plurality of TSCH nodes may be configured to store in a neighbor table indications corresponding to the capability information element received in communications from other TSCH nodes. The capability information element may indicate that the other TSCH nodes support communication over the secondary TSCH network.

The processor of each of the TSCH nodes of the plurality of TSCH nodes may be configured to cause the transceiver to broadcast a second communication over the primary TSCH network including the capability information element indicating that the TSCH node supports communication over the secondary TSCH network.

The processor of the first TSCH node of the plurality of TSCH nodes may be configured to determine the delay period as a macTsTxOffset time period plus an additional macTsCCAOffset time period plus a macTsRxWait time period. The macTsTxOffset time period may be a period of time a sender node waits to transmit a frame to make communication possible when the sender node is ahead in time of a receiver node, the additional macTsCCAOffset time period may be a period of time to allow clear channel assessment after the macTsTxOffset time period, and the macTsRxWait time period may be a period of time the receiver node waits to start receiving the frame after the receiver node starts listening to a transmission medium.

The MAC address of the second TSCH node may be associated with the channel hopping sequence of the second TSCH node on the secondary TSCH network. The first TSCH node may determine the channel on the secondary TSCH network to transmit the unicast frame to the second TSCH node based the channel hopping sequence associated with the MAC address of the second TSCH node contained in a neighbor table stored in the memory of the first TSCH node. A primary portion of the primary TSCH timeslot may be prioritized for transmitting broadcast/multicast frames.

A channel hopping protocol of the secondary TSCH network may switch frequencies less often than or at a same rate as a channel hopping protocol of the primary TSCH network switches frequencies.

Numerous benefits are achieved by way of the various embodiments over conventional techniques. For example, the various embodiments provide methods and systems that increase the probability of successful broadcast transmission. In some embodiments, a first portion of a contention access period (CAP) timeslot of a primary TSCH network is prioritized to be utilized for broadcast transmissions, and a secondary portion of the timeslot is utilized to listen for and communicate unicast messages on a secondary TSCH network. This may permit the channel associated with a CAP timeslot of the primary network to be reserved or prioritized for broadcast communications when the entire PAN is listening on a same channel, and permit a channel associated with the secondary TSCH network to be used for unicast transmissions that are time-shifted within the timeslots. These and other embodiments along with many of its advantages and features are described in more detail in conjunction with the text below and attached figures.

BRIEF DESCRIPTION OF THE DRAWINGS

Aspects and features of the various embodiments will be more apparent by describing examples with reference to the accompanying drawings, in which:

FIG. 1B illustrates an example of a hopping pattern according to various aspects of the present disclosure;

FIG. 4A is a timeslot diagram illustrating an example transmission of a multi-slot broadcast frame according to various aspects of the present disclosure;

FIG. 4B is a timeslot diagram illustrating an example transmission of a multi-slot unicast frame according to various aspects of the present disclosure;

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Figure 1A:
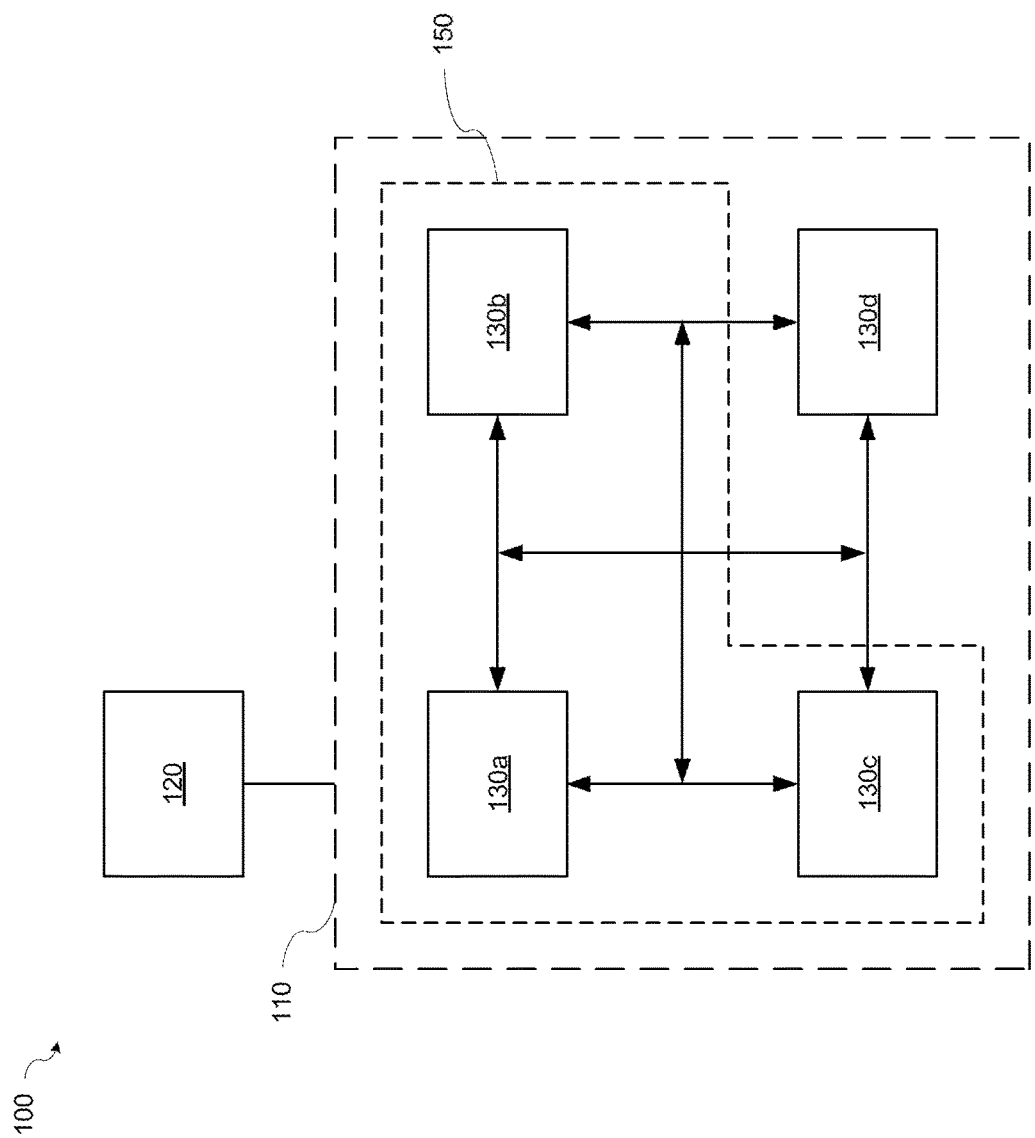
FIG. 1A is a diagram illustrating a TSCH network according to various aspects of the present disclosure.

Devices in a data network may communicate using a time synchronized channel hopping (TSCH) protocol, for example, as defined by IEEE 802.15.4(e). The TSCH protocol uses a series of timeslots and multiple channel frequencies for communication between devices. FIG. 1A is a diagram illustrating a TSCH network according to various aspects of the present disclosure.

Referring to FIG. 1A, the TSCH network 100 may include a primary network 110 and a secondary network 150. The primary network 110 may communicate with a coordinator node 120, which may in turn communicate with a central system, for example, but not limited to, a head-end system for a power distribution network, via one or more additional nodes and networks (not shown). The primary network 110 may include a plurality of TSCH devices, also referred to herein as nodes or endpoints (EPs) 130*a*-130*d*. For example, the nodes 130*a*-130*d* may be electric meters. The primary network 110 may be, for example, an advanced metering infrastructure mesh network. Some of the nodes (e.g., nodes 130*a*-130*c*) on the primary network 110 may also be configured to communicate on the secondary network 150, while other nodes (e.g., node 130*d*) may be configured to communicate only on the primary network 110.

The primary network 110 may operate using a primary channel hopping protocol. The secondary network 150 may operate using a secondary channel hopping protocol. The primary channel hopping protocol of the primary network 110 may switch channel frequencies every timeslot, while the secondary channel hopping protocol of the secondary network 150 may switch channel frequencies after multiple timeslots. A timeslot for the primary network may be a fixed length timeslot and may be the same length as a timeslot for the secondary network. A timeslot may be a transmit timeslot or a receive timeslot as may be determined by the coordinator node 120.

The nodes 130*a*-130*d* may maintain synchronization with each other by periodically transmitting beacons to each other over the primary network 110. In the primary network 110, all of the nodes 130*a*-130*d* may be synchronized to communicate on a same channel during a portion of the TSCH timeslot, for example, the first one-third of the timeslot. During the remaining two-thirds of the timeslot, the nodes may listen for communications from devices on the secondary network or may send a communication on the secondary network. As used herein, the first approximately one-third of a timeslot may be referred to as the primary portion of the timeslot and the remaining approximately two-thirds of the timeslot may be referred to as the secondary portion of the timeslot.

FIG. 1B illustrates an example of a channel hopping protocol according to various aspects of the present disclosure. A channel hopping protocol defines a channel frequency, or channel, for each timeslot in the hopping pattern. Each node communicating on the primary network may hop channels according to the primary channel hopping protocol. Referring to FIG. 1B, the hopping pattern for the primary channel hopping protocol 186 corresponding to the timeslots 188 may be channel 4, channel 6, channel 3, channel 5, channel 7, i.e., it may associate channel 4 with timeslot 1, channel 6 with timeslot 2, channel 3 with timeslot 3, channel 5 with timeslot 4, and channel 7 with timeslot 5. As illustrated in FIG. 1B, a first iteration 185*a* of the hopping pattern contains timeslots 1-5 (182*a*-182*e*), the second iteration 185*b* of the hopping pattern contains timeslots 6-10 (183*a*-183*e*), and the third iteration 185*c* of the hopping pattern contains timeslots 11-15 (184*a*-184*e*).

Each node communicating on the secondary network may have a unique channel hopping pattern on the secondary network. For example, referring to FIG. 1B, the unique hopping pattern 183 for a particular node communicating on the secondary network may be channel 2, channel 8, channel 4, channel 10, channel 6, i.e., it may associate channel 2 with timeslot 1, channel 8 with timeslot 2, channel 4 with timeslot 3, channel 10 with timeslot 4, and channel 6 with timeslot 5. In some implementations, the secondary channel hopping protocol for the secondary network 150 may switch channel frequencies at a much slower rate than the channel hopping protocol of the primary network 110, i.e., the channel hopping protocol for the secondary network 150 may cause the secondary network 150 to remain on the same channel for multiple timeslots. Referring again to FIG. 1B, the secondary channel hopping protocol 181 may cause the secondary network 150 to remain on channel 2 for four timeslots before switching to channel 8 for four timeslots, etc. In other implementations, the secondary channel hopping protocol for the secondary network 150 may switch channel frequencies at a same rate as the channel hopping protocol of the primary network 110.

One of ordinary skill in the art will appreciate that the hopping patterns described with respect to FIG. 1B are merely exemplary and that other hopping patterns are possible. The secondary network 150 may remain on a given channel for a predetermined number of timeslots and so may switch frequencies at a much slower rate than the primary network 110. One of ordinary skill in the art would recognize many variations and alternatives.

A node may have a MAC address that uniquely identifies the node on the primary TSCH network and the secondary TSCH network. A channel associated with a CAP timeslot of the primary network may be prioritized for broadcast communications initiated within the primary portion of the timeslot where all the nodes are listening on the same channel. Unicast messages may be transmitted by nodes by time-shifting their transmission and initiating the unicast messages within the secondary portion of the timeslot and utilizing the secondary TSCH network for the unicast transmission.

Figure 2A:
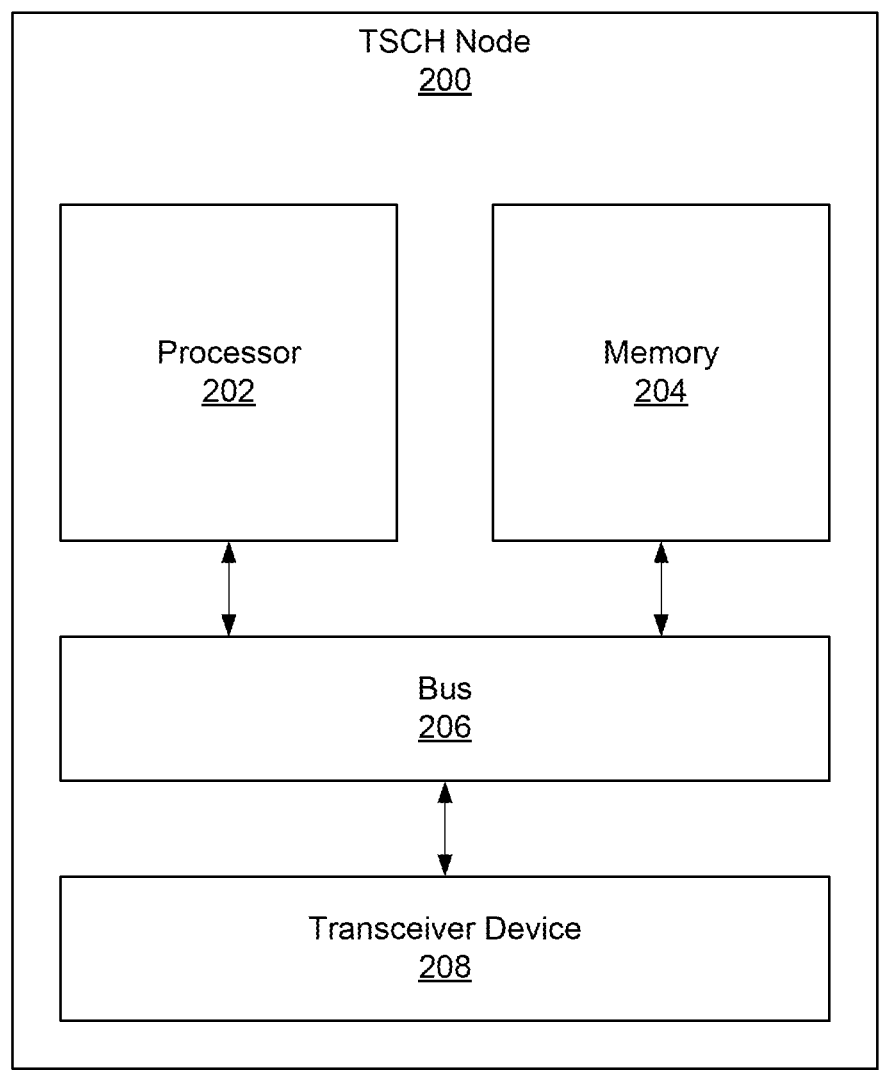
FIG. 2A is a block diagram illustrating an example of a TSCH EP according to various aspects of the present disclosure.

FIG. 2A is a block diagram illustrating an example of a TSCH node 200 according to various aspects of the present disclosure. The TSCH node may include a processor 202, memory 204, and a transceiver device 208. The processor 202, memory 204, and the transceiver device 208 may be communicatively coupled via a bus 206. The components of TSCH node 200 may be powered by an AC power supply. The TSCH node 200 may be part of the primary TSCH network (e.g., the primary network 110).

The processor 202 may include, for example, but not limited to, a microprocessor, an application-specific integrated circuit ("ASIC"), a state machine, a field programmable gate array ("FPGA"), or another suitable processing device. The processor 202 may include any number of processing devices, including one. The processor 202 may be communicatively coupled to a non-transitory computer-readable media, such as the memory 204. The processor 202 may execute computer-executable program instructions or access information stored in memory 204. The processor 202 may control overall operation of the TSCH node 200.

The transceiver device 208 may be configured to communicate with other TSCH nodes in the primary TSCH network. The transceiver device 208 also be configured to communicate over a secondary network. In some examples, the transceiver device 208 may include a radio-frequency (RF) transceiver and other transceivers for wirelessly transmitting and receiving signals.

Figure 2B:
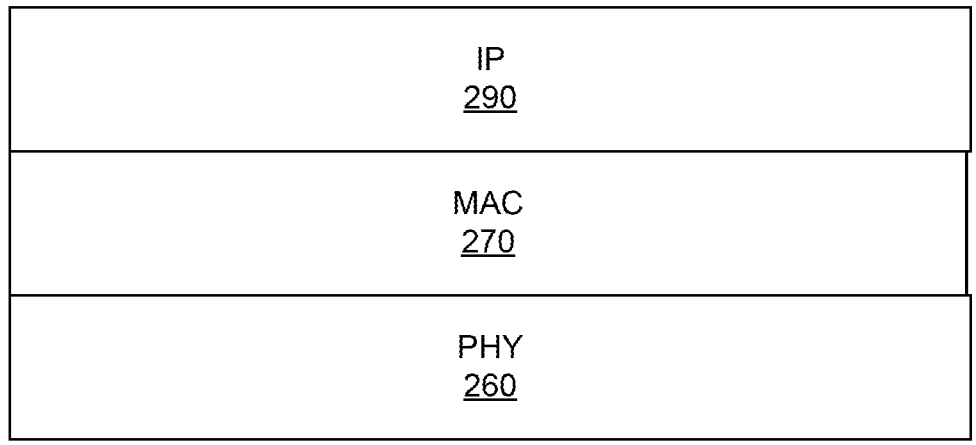
FIG. 2B is a diagram illustrating a portion of an example protocol stack 250 for an EP configured to implement two different MAC protocols according to various aspects of the present disclosure.

FIG. 2B is a diagram illustrating a portion of an example protocol stack 250 for a node (i.e., a TSCH node) according to various aspects of the present disclosure. Referring to FIG. 2B, the protocol stack 250 may include, at the bottom layer, the physical interface (PHY) 260. The PHY 260 may define the specifications of the physical transmission medium. The next layer of the protocol stack 250 may include a MAC layer 270. The MAC layer 270 may have a MAC address and may define the addressing and channel access protocols for a primary network to enable the node to communicate with the primary network. Similarly, the MAC layer 270 may define the channel access protocol for the secondary network to enable the node to communicate on the secondary network. Messages communicated for the MAC layer 270 may be routed Embodiments in accordance with the present disclosure attempt to use the secondary network exclusively for unicast communication, thereby increasing the probability of successful broadcast transmission by prioritizing the first portion of a CAP timeslot for broadcast transmissions on a primary TSCH network and transmitting unicast messages via a secondary TSCH network during a subsequent portion of the timeslot.

Figure 3:
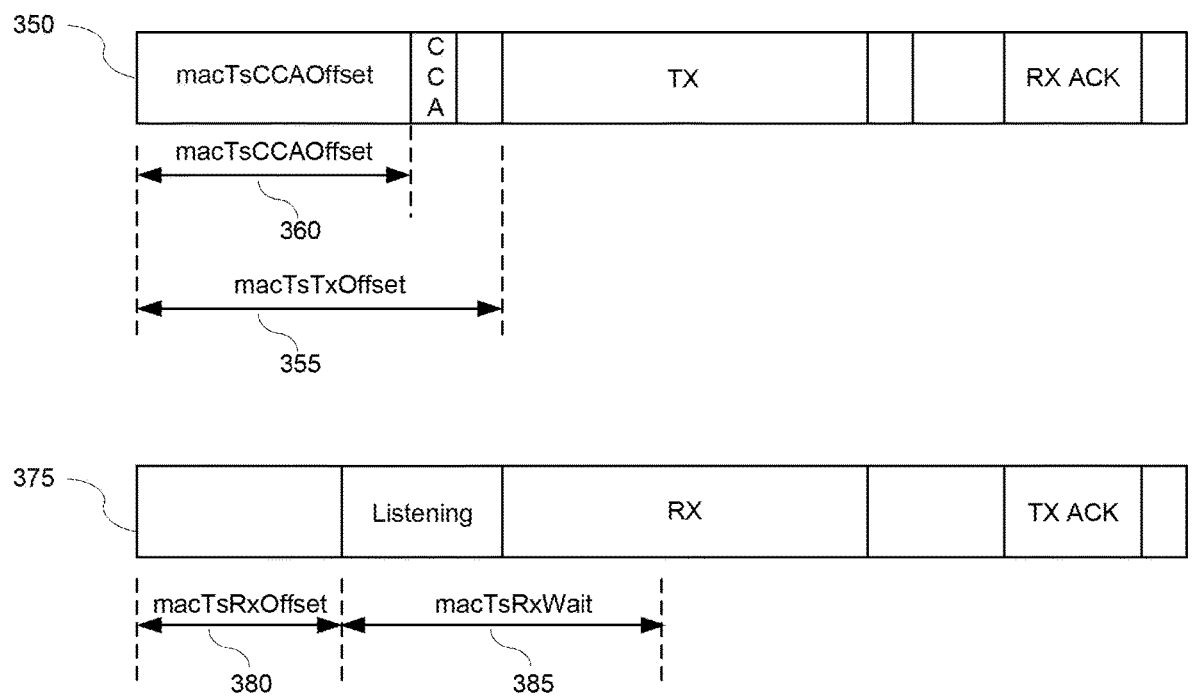
FIG. 3 is a diagram illustrating the structure of a transmit timeslot and a receive timeslot for a TSCH network and the transmission offset for a transmitting node according to various aspects of the present disclosure.

FIG. 3 is a diagram illustrating the structure of a transmit timeslot 350 and a receive timeslot 375 for a TSCH network and the transmission offset for a transmitting node according to various aspects of the present disclosure. During normal operation, a node (e.g., nodes 130a-130d) listens on the primary network 110 for approximately the first one-third (i.e., the primary portion) of the TSCH timeslot 375 before switching to the secondary network 150 for the remaining approximately two-thirds (i.e., the secondary portion) of the timeslot 375 to listen for communications on the secondary network 150. When the receiving node is capable of communicating on the secondary network, the transmitting node may offset transmission of the frame for a specified period of time.

Referring to FIG. 3, a transmit timeslot 350 for a TSCH network may include a macTsTxOffset period 355, a macTsCCAOffset period 360. A receive timeslot 375 may include a macTsRxOffset period 380 and macTsRxWait period 385. The macTsTxOffset period 355 is a period of time a sender node waits to transmit a frame to make communication possible when the sender node is ahead in time of the receiver node. The macTsCCAOffset period 360 is a period of time to allow clear channel assessment of a switched channel. The macTsRxOffset period 380 is an offset at the beginning of a receiving node's timeslot before the receiving node starts listening to the medium to prevent interference from other nodes in the network. The macTsRxWait period 385 is a period of time a receiving node waits to start receiving a frame after the receiving node starts listening to the transmission medium. During the macTsRxWait period 385, a receiving node may listen for a broadcast message on a channel determined by the hopping pattern for the primary network 110. All nodes may be listening on the same channel.

When a node receives the beginning of a message from another node on the primary network 110 during the macTsRxWait period 385, the node may continue to receive the message on the primary network 110 until the complete message is received. The message may be completely received during the timeslot or may extend into one or more subsequent timeslots. If the node does not begin receiving a message on the primary network 110 prior to the expiration of the macTsRxWait period 385, then the node may switch to its assigned channel on the secondary network and begin to listen for a communication from another node on the secondary network 150. If a communication from another node on the secondary network 150 is received, the receiving node may receive the message from the secondary network 150 during the remainder of the timeslot until the complete message is received. The message may be completely received during the timeslot or may extend into one or more subsequent timeslots.

The specified transmission offset period for the transmitting node to offset transmission of the frame on the secondary network may be determined as macTsTxOffset plus an additional macTsCCAOffset plus macTsRxWait. The specified transmission offset period may pass the first approximately one-third of the timeslot to allow the destination node to switch to its channel on the secondary network. This process gives precedence to broadcast messages as nodes will first listen to the primary network for transmissions before switching to the channel on the secondary network. Further, the process allows for optimal spectrum use as two or more pairs of nodes can communicate with each other simultaneously since they will transmit on the destination node's EUI64-based secondary network channel of the receiving node without collision. In dense deployments, this technology may allow nodes to communicate with less opportunity for channel collision and provide higher probability of success for multicast/broadcast frames.

Since the MAC address (i.e., the EUI64 address) of the receiving or destination node determines the channel hoping sequence, the transmitting node may switch to the channel of the destination node according to the information contained in the MAC neighbor table of the transmitting node to transmit the frame (i.e., the unicast message) to the destination node after the specified transmission offset period.

When a node has a frame to transmit, a link scheduling algorithm may determine whether the frame is a broadcast/multicast message or a unicast message. A broadcast/multicast message may be communicated over the primary network link to enable nodes within reception range to receive the frame. When the frame is a unicast message and the receiving node supports communications over the secondary network, the message may be communicated over the secondary network. The destination MAC address of a receiving node for a unicast message may be indicated as supporting communication over a secondary network in the MAC neighbor table of the transmitting node. The neighbor table may be stored in memory of the node and may contain entries associated with information about other nodes on the primary network including, for example, but not limited to, MAC addresses and capability information (e.g., whether a node can communicate on a secondary network, etc.).

The indication regarding whether a destination MAC address supports communication over a secondary network may be provided by a capability information element (IE) included in an initial communication, for example, but not limited to, a beacon, an enhanced beacon (EB) (i.e., a TSCH frame that contains information on synchronization, channel hopping and timeslot used in the network) or other communication from the node. In accordance with various aspects of the present disclosure, nodes not capable of communicating on the secondary network may also be indicated in the MAC neighbor table of the transmitting node. Accordingly, unicast messages to nodes not capable of communicating on the secondary network may be sent in a conventional manner (i.e., during the primary portion of a CAP timeslot on the primary network).

FIG. 4A is a timeslot diagram 400 illustrating an example transmission of a multi-slot broadcast frame according to various aspects of the present disclosure. Referring to FIG. 4A, the link scheduling algorithm may determine that a first node (i.e., Node2) on the primary network (e.g., the primary network 110) has a broadcast/multicast message to transmit and may schedule the transmission. The first node may transmit the broadcast frame 405 over the primary network. The first node may transmit 404 the broadcast frame 405 during the primary portion 406 of the first timeslot 401. During the primary portion 406 of the first timeslot 401 (i.e., the first approximately one-third of the timeslot), all of the nodes on the primary network may be synchronized to the same channel (i.e., frequency). Therefore, when the first node transmits 404 the broadcast frame 405 over the primary network the other nodes (i.e., Node1 and Node3-Node5) on the primary network receive 410 the broadcast frame 405. Transmission/reception of the broadcast frame may conclude in the secondary portion 408 of the subsequent timeslot 402. The message may be completely received during the timeslot or may extend into one or more subsequent timeslots. No acknowledgement (ACK) is sent by the nodes to acknowledge receipt of the broadcast frame.

FIG. 4B is a timeslot diagram 420 illustrating an example transmission of a multi-slot unicast frame according to various aspects of the present disclosure. Referring to FIG. 4B, the link scheduling algorithm for a first node (i.e., Node2) may determine that the first node has a unicast frame to transmit and may schedule the transmission to the recipient node, in this case a second node (i.e., Node1), during a first timeslot 421. The first node (Node2) may refer to a neighbor table to determine a MAC address of the second node (Node1). The neighbor table may be stored in memory (e.g., the memory 204 of the TSCH node 200) of first node (Node2). The MAC address of the second node (Node1) may determine the channel hopping pattern (i.e., the channel frequency and number of timeslots the channel is active on the channel frequency) for the second node (Node1) when communicating on the secondary network.

The transmitting node (Node2) may offset transmission of the unicast message for a macTsTxOffset period plus an additional macTsCCA period to allow clear channel assessment of the switched channel, plus a macTsRxWait period, which will pass the first one-third of the timeslot 421 to allow the receiving node (Node1) to switch to its channel on the secondary network, and allows the transmitting node to confirm that a broadcast transmission was not initiated during the primary portion of the timeslot. Since the MAC address of the receiving node (Node1) determines the hopping sequence, the transmitting node (Node2) will synchronize to that channel on the secondary network to transmit 424 the unicast frame 425 to the receiving node (Node1).

Clear channel assessment (CCA) may be performed by the first node (Node2) to validate that the channel on the secondary network is available. If the first node (Node2) detects energy on the channel, for example, another device transmitting on the channel, the unicast frame 425 may not be transmitted and transmission may be attempted again after a random back-off period. When the first node (Node2) transmits the unicast frame 425, the second node (Node1) may receive 430 the unicast frame 425 on the secondary network. Transmission/reception of the unicast frame may conclude in the primary portion 436 of the subsequent timeslot 422. The message may be completely received during the timeslot or may extend into one or more subsequent timeslots. The second node (Node1) may acknowledge receipt 435 of the unicast transmission during the secondary portion 437 of the subsequent timeslot 422 on the same channel.

Figure 4C:
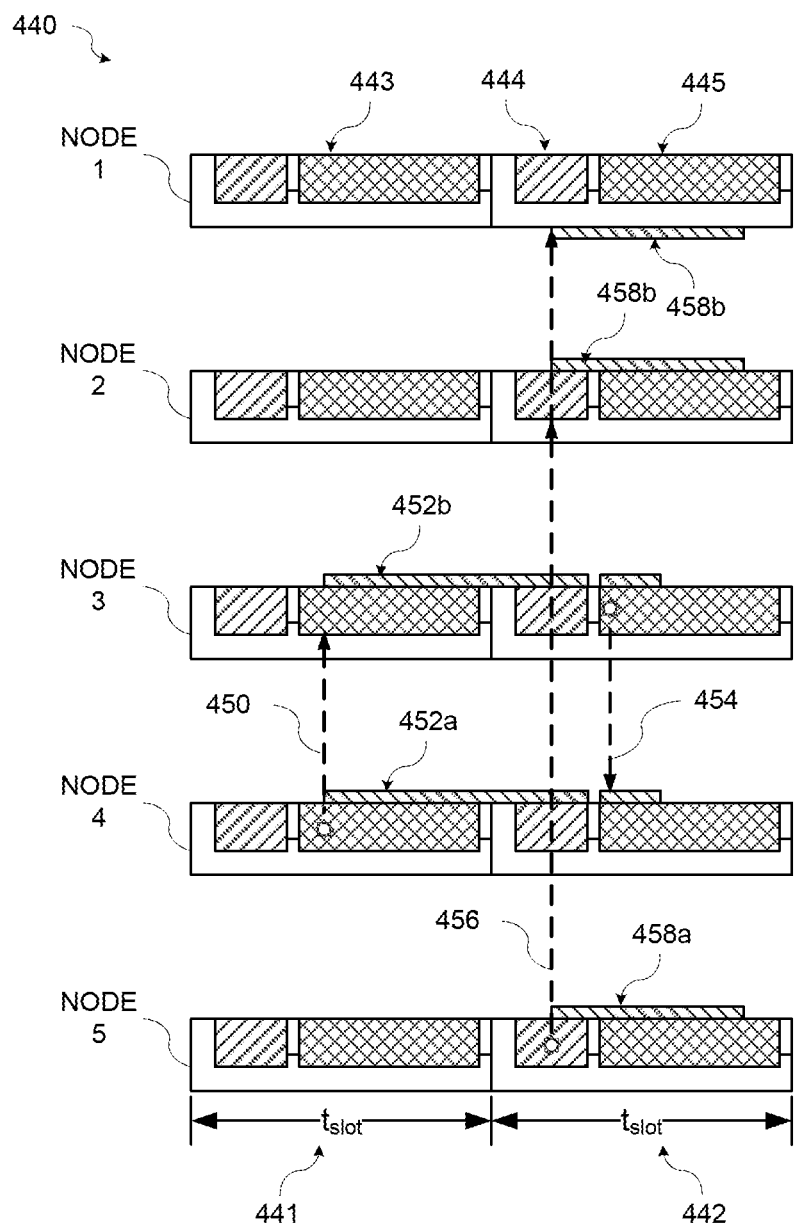
FIG. 4C is a timeslot diagram illustrating an example transmission of a multi-slot unicast frame and a broadcast frame according to various aspects of the present disclosure.

FIG. 4C is a timeslot diagram 440 illustrating an example transmission of a multi-slot unicast frame and a broadcast frame according to various aspects of the present disclosure. Referring to FIG. 4C, the link scheduling algorithm for a first node (i.e., Node4) may determine that the first node has a unicast frame to transmit and may schedule the transmission to the recipient node, in this case a second node (i.e., Node3), during a first timeslot 441. Similarly, the link scheduling algorithm for a third node (i.e., Node5) may determine that the third node has a broadcast/multicast message to transmit and may schedule the transmission during a second timeslot 442.

The first node (Node4) may refer to a neighbor table to determine the MAC address of the second node (Node3). The neighbor table may be stored in memory of the first node (Node4). The MAC address of the second node (Node3) may determine the channel hopping pattern for the second node (Node3) when communicating on the secondary network. During the secondary portion 443 of the first timeslot 441 (i.e., the approximately last two-thirds of the timeslot), the first node (Node4) may switch to the frequency of the second node (Node3) on the secondary network and may attempt to transmit 450 the unicast frame 452a to the second node (Node3).

The transmitting node (Node4) may offset transmission of the unicast message for a macTsTxOffset period plus an additional macTsCCA period to allow clear channel assessment of the switched channel, plus a macTsRxWait period, which will pass the first one-third of the timeslot 441 to allow the receiving node (Node3) to switch to its channel on the secondary network, and allows the transmitting node to confirm that a broadcast transmission was not initiated during the primary portion of the timeslot. Since the MAC address of the receiving node (Node3) determines the hopping sequence, the transmitting node (Node4) will synchronize to that channel on the secondary network to transmit 450 the unicast frame 452a to the receiving node (Node3).

Clear channel assessment (CCA) may be performed the first node (Node4) to validate that the channel on the secondary network is available and if energy is detected on the channel, transmission of the unicast frame 452a may be attempted again after a random back-off period. When the first node Node4 transmits the unicast frame 452a, the second node (Node3) may receive 452b the unicast frame on the secondary network. Transmission/reception of the unicast frame 452a may conclude in the primary portion 444 of the subsequent (i.e., second) timeslot 442. The message may be completely received during the timeslot or may extend into one or more subsequent timeslots. The second node (Node3) may acknowledge receipt 454 of the unicast transmission during the secondary portion 445 of the subsequent (i.e., second) timeslot 442 on the same channel.

While the unicast transmission between the first node (Node4) and the second node (Node3) is in progress, a third node (Node5) may transmit 456 a broadcast frame 458a during the primary portion 444 of the second timeslot 442. During the primary portion 444 of the second timeslot 442 (i.e., the first approximately one-third of the timeslot), only the third node (Node5) and nodes (Node1) and (Node2) on the primary network may be synchronized to the same channel since first node (Node4) and the second node (Node3) are tuned to the channel on the secondary network corresponding to the MAC address of the second node (Node3) for transmission/reception of the unicast frame 452a. Therefore, when the third node (Node5) transmits the broadcast frame 458a over the primary network only nodes (Node1) and (Node2) on the primary network receive 458b the broadcast frame 458a. Transmission/reception of the broadcast frame 458a may conclude in the secondary portion 445 of the subsequent timeslot 442. The message may be completely received during the timeslot or may extend into one or more subsequent timeslots. No acknowledgement (ACK) is sent by the node to acknowledge receipt of the broadcast frame 458a.

Figure 4D:
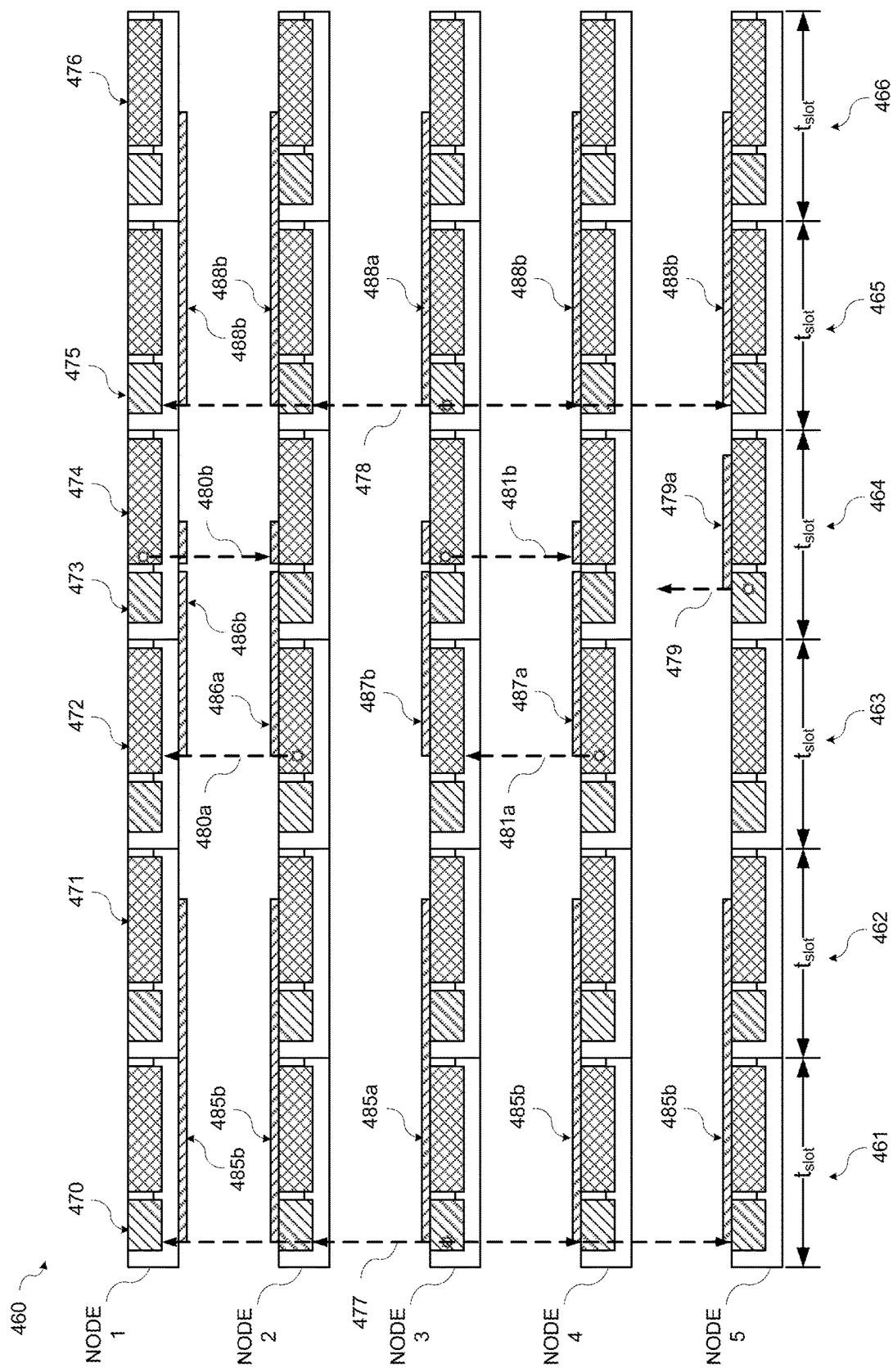
FIG. 4D is a timeslot diagram illustrating an example sequence of transmissions of multi-slot unicast frames and broadcast frames.

FIG. 4D is a timeslot diagram 460 illustrating an example sequence of transmissions of multi-slot unicast frames and broadcast frames according to various aspects of the present disclosure. Referring to FIG. 4D, the link scheduling algorithm for a first node (i.e., Node3) may determine that the first node has a broadcast frame to transmit and may schedule the transmission during a first timeslot 461. Similarly, the link scheduling algorithm for a second node (i.e., Node2) may determine that the second node has a unicast messages to transmit and the link scheduling algorithm for a third node (i.e., Node4) may determine that the third node has a unicast messages to transmit and may schedule the transmissions to the recipient nodes, in this case a fourth node (i.e., Node1) and the first node (Node3), respectively, during a third timeslot 463. Also, the link scheduling algorithm for a fifth node (i.e., Node5) may determine that the fifth node has a broadcast frame to transmit and may schedule the transmission during a fourth timeslot 464. Finally, the link scheduling algorithm for the first node Node3) may determine that the first node has another broadcast frame to transmit and may schedule the transmission during a fifth timeslot 465.

The first node (Node3) may transmit the broadcast frame 485a over the primary network. The first node (Node3) may transmit 477 the broadcast frame 485a during the primary portion 470 of the first timeslot 461. During the primary portion 470 of the first timeslot 461 (i.e., the first approximately one-third of the timeslot), all of the nodes on the primary network may be synchronized to the same channel (i.e., frequency) on the primary network. Therefore, when the first node (Node3) transmits the broadcast frame 485a over the primary network the other nodes (Node1, Node2, Node4, and Node5) on the primary network receive 485b the broadcast frame 485a. Transmission/reception of the broadcast frame may conclude in the secondary portion 471 of the subsequent timeslot 462. The message may be completely received during the timeslot or may extend into one or more subsequent timeslots. No acknowledgement (ACK) is sent by the nodes to acknowledge receipt of the broadcast frame.

Prior to transmitting the unicast frame in the third timeslot 463, the second node (Node2) may refer to a neighbor table to determine the MAC address of the fourth node (Node1). The neighbor table may be stored in memory of the second node (Node2). The MAC address of the fourth node (Node1) may determine the channel hopping pattern (i.e., the channel frequency and number of timeslots the channel is active on the channel frequency) for the fourth node (Node1) when communicating on the secondary network. Similarly, the third node (Node4) may refer to a neighbor table stored in its memory to determine the MAC address of the first node (Node3) for the secondary network to determine the channel hopping pattern for the first node (Node3) for the secondary network.

During the secondary portion 472 of the third timeslot 463 (i.e., the approximately last two-thirds of the timeslot), the second node (Node2) may synchronize to the frequency of the third node (Node1) on the secondary network and the fourth node (Node4) may synchronize to the frequency of the first node (Node3) on the secondary network. After offsetting transmission of the unicast frame as described above, during the secondary portion 472 of the third timeslot 463 the second node (Node2) may attempt to transmit 480a its unicast frame 486a to the second node (Node1) and the fourth node (Node4) may attempt to transmit 481a its unicast frame 487a to the first node (Node3). Since the unicast frames are transmitted on different channels of the secondary network determined by the channel hopping patterns associated with the MAC addresses of the first node (Node3) and the third node (Node1), the unicast messages do not collide and will be received by the respective recipient nodes.

Clear channel assessment (CCA) may be performed by the second node (Node2) and the fourth node (Node4) to validate that the channels on the secondary network are available and if energy is detected on their respective channels, transmission of the unicast frames 486a, 487a may be attempted again after random back-off periods. When the second node (Node2) transmits 480a the unicast frame 486a, the third node (Node1) may receive 486b the unicast frame 486a on the secondary network. Transmission/reception of the unicast frame may conclude in the primary portion 473 of the subsequent timeslot 464 or may extend into one or more subsequent timeslots. The third node (Node1) may acknowledge receipt 480b of the unicast frame during the secondary portion 474 of the subsequent timeslot 464 on the same channel. Similarly, the first node (Node3) may receive 487b the unicast frame 487a on the secondary network. Transmission/reception of the unicast frame may conclude in the primary portion 473 of the subsequent timeslot 464 or may extend into one or more subsequent timeslots, and the first node (Node3) may acknowledge receipt 481b of the unicast frame during the secondary portion 474 of the subsequent timeslot 464 on the same channel.

While the unicast transmissions between the second node (Node2) and the third node (Node1) and between the fourth node (Node4) and the first node nodes are in progress, the fifth node (Node5) may attempt to transmit 479 a broadcast frame 479a during the primary portion 473 of the fourth timeslot 464. However, during the primary portion 473 of the fourth timeslot 464 the other nodes (Node1-Node4) are tuned to the secondary network to transmit/receive unicast frames. Therefore, the broadcast frame 479a transmitted by the fifth node (Node5) is not received by the other nodes (Node1-Node4).

In the fifth timeslot 465, the first node (Node3) may transmit another broadcast frame 488a over the primary network. The first node (Node3) may transmit 478 the broadcast frame 488a during the primary portion 475 of the fifth timeslot 465. During the primary portion 475 of the fifth timeslot 465, all of the nodes on the primary network may again be synchronized to the same channel on the primary network. Therefore, when the first node (Node3) transmits the broadcast frame 488a over the primary network the other nodes (Node1, Node2, Node4, and Node5) on the primary network receive 488b the broadcast frame 488a. Transmission/reception of the broadcast frame may conclude in the secondary portion 476 of the subsequent timeslot 466. The message may be completely received during the timeslot or may extend into one or more subsequent timeslots. No acknowledgement (ACK) is sent by the nodes to acknowledge receipt of the broadcast frame.

Figure 5:
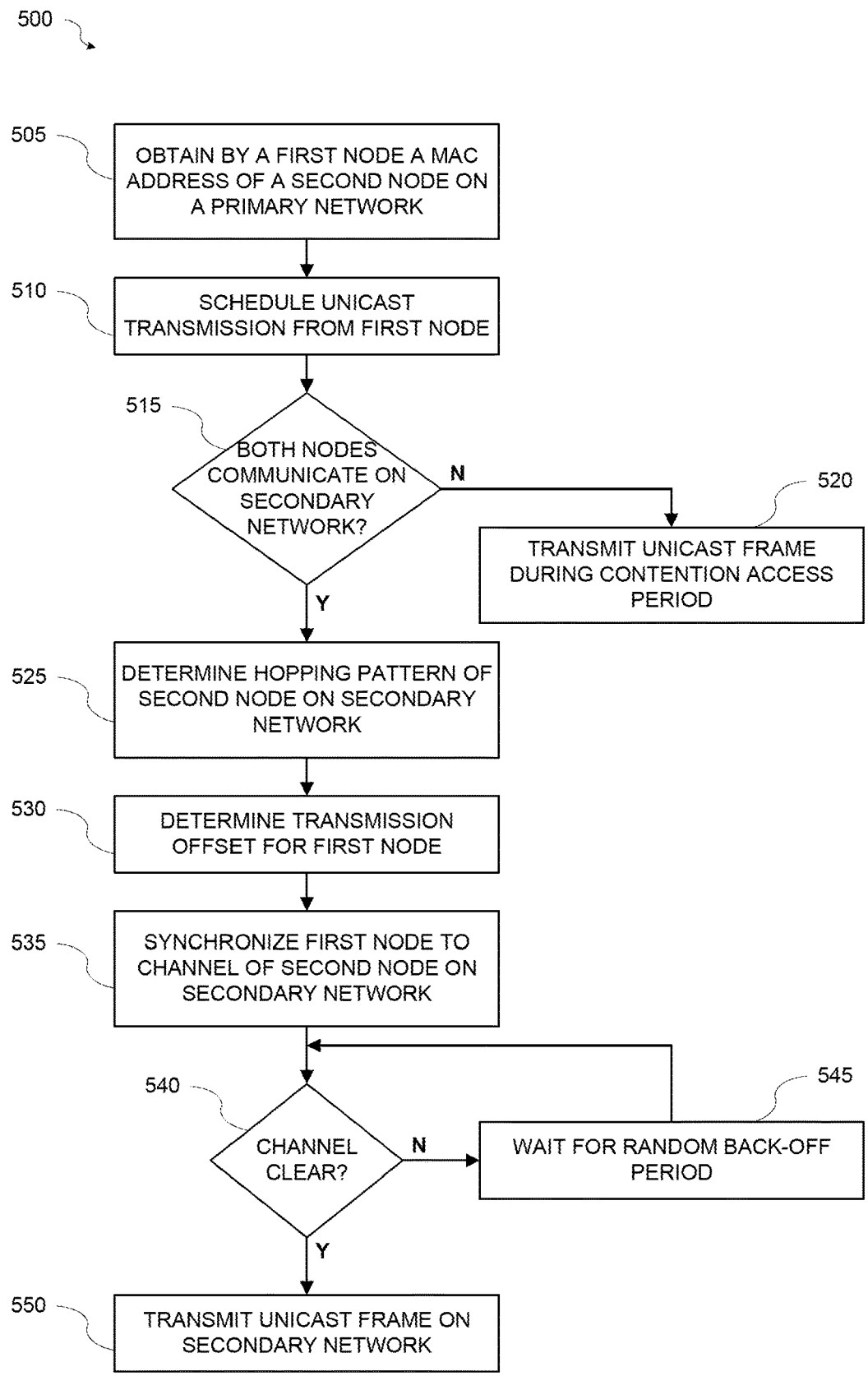
FIG. 5 is a flowchart illustrating a method for unicast communication according to various aspects of the present disclosure.

FIG. 5 is a flowchart illustrating a method for unicast communication according to various aspects of the present disclosure. Referring to FIG. 5, at block 505, a first node on a primary network may determine to send a unicast frame to a second node on the primary network and may obtain a MAC address of a second node on the primary network that may be a destination node for the unicast frame. For example, the MAC address of the second node may be contained in a neighbor table stored in a memory of the first node.

At block 510, a unicast frame may be scheduled for transmission from the first node on a primary network to a second node on the primary network. For example, a link scheduling algorithm for the first node may determine that the first node has a unicast frame to transmit and may schedule the transmission to the recipient node during a specified timeslot.

At block 515, it may be determined whether the first node and the second node are configured for communication on a secondary network. For example, the processor of the transmitting node may determine whether the nodes are capable of communication on a secondary network. An indication regarding whether a destination MAC address supports communication over a secondary network may be provided by a capability IE included in an initial communication, for example, a beacon, an enhanced beacon or other communication from the node. Nodes capable of communicating on the secondary network may be indicated in the MAC neighbor table of the transmitting node. In some cases, the capability information for the receiving node may indicate that the receiving node is not capable of communication on the secondary network.

When it is determined that at least one of the nodes is not capable of communication on a secondary network (515-N), at block 520 the unicast frame may be transmitted in a conventional manner on the primary network during the contention access period of the primary TSCH network timeslot.

When it is determined that both of the nodes are capable of communication on a secondary network (515-Y), at block 525, the first node may refer to a neighbor table to determine the hopping pattern of the second node for the secondary network. The neighbor table may be stored in memory of the first node and may contain entries associated with information about other nodes on the primary network including, for example, but not limited to, MAC addresses, capability information (e.g., whether a node can communicate on a secondary network, etc.). The MAC address of the second node for the secondary network may determine the channel hopping pattern (i.e., the channel frequency and number of timeslots the channel is active on the channel frequency) for the second node when communicating on the secondary network.

At block 530, the first node may determine a transmission offset for the unicast frame. The first node may offset transmission of the unicast frame for a specified period of time during the specified timeslot to allow the second (i.e., destination) node to switch to its channel on the secondary network. The specified transmission offset period may be determined as macTsTxOffset plus an additional macTsCAOffset plus macTsRxWait. At block 535, the first node may synchronize to the channel hopping sequence and frequency of the second node on the secondary network during the secondary portion of the specified timeslot.

At block 540, the first node may determine whether the channel is clear by performing a CCA. In response to determining that the channel is not clear (540-N), at block 545 the first node may wait for a random back-off period to attempt to transmit the unicast frame and the method may return to block 540 to perform CCA. In response to determining that the channel is clear (540-Y), at block 550 the first node may transmit the unicast frame to the second node on the secondary network.

The method 500 may be embodied on a non-transitory computer readable medium, for example, but not limited to, a memory or other non-transitory computer readable medium known to those of skill in the art, having stored therein a program including computer executable instructions for making a processor, computer, or other programmable device execute the operations of the methods.

It should be appreciated that the specific steps illustrated in FIG. 5 provide a particular method for unicast communication according to another embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

The systems and methods of the present disclosure give precedence to broadcast frames as nodes will first listen to the primary network for transmissions before switching to a channel on the secondary network. The systems and methods of the present disclosure may provide for optimal spectrum use as two or more pairs of nodes can communicate with each other simultaneously by transmitting on the secondary network to the channel of the destination nodes (i.e., the EUI64 based channel) without collision. In dense deployments, nodes may communicate with less opportunity for channel collision and provide higher probability of success.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A method for transmitting unicast messages, the method comprising:
    determining, by a first node, to transmit a unicast message to a second node;
    obtaining, by the first node configured to communicate on a primary time-slotted channel hopping (TSCH) network, a media access control (MAC) address of the second node configured to communicate on the primary TSCH network;
    determining whether the first node and the second node are also configured to communicate on a secondary TSCH network; and
    in response to determining that the first node and the second node are also configured to communicate on the secondary TSCH network:
        offsetting transmission of the unicast message until a second portion of a timeslot for the primary TSCH network;
        synchronizing to a channel hopping sequence and frequency of the secondary TSCH network for the second node, and
        transmitting, by the first node, the unicast message to the second node on the secondary TSCH network during the second portion of the timeslot.

2. The method of claim 1, wherein the first node offsets transmission of the unicast message during the timeslot for a specified delay period,
    wherein offsetting transmission for the specified delay period causes the first node to transmit the unicast message during the second portion of the timeslot when the second node is listening on the secondary TSCH network.

3. The method of claim 2, wherein the specified delay period is determined as a macTsTxOffset time period plus an additional macTsCCAOffset time period plus a macTsRxWait time period,
    wherein the macTsTxOffset time period is a period of time a sender node waits to transmit a frame to make communication possible when the sender node is ahead in time of a receiver node, the additional macTsCCAOffset time period is a period of time to allow clear channel assessment after the macTsTxOffset time period, and the macTsRxWait time period is a period of time the receiver node waits to start receiving the frame after the receiver node starts listening to a transmission medium.

4. The method of claim 2, wherein a primary portion of the timeslot is prioritized for transmitting broadcast/multicast messages.

5. The method of claim 1, wherein the MAC address of the second node is associated with the channel hopping sequence of the second node on the secondary TSCH network, and
    wherein the first node determines the channel on the secondary TSCH network to transmit the unicast message to the second node based the channel hopping sequence associated with the MAC address of the second node contained in a neighbor table stored in a memory of the first node.

6. The method of claim 1, wherein prior to transmitting the unicast message to the second node, the first node receives a communication from the second node over the primary TSCH network, wherein the communication contains a capability information element indicating that the second node supports communication over the secondary TSCH network.

7. The method of claim 1, wherein a channel hopping protocol of the secondary TSCH network switches frequencies less often than a channel hopping protocol of the primary TSCH network switches frequencies.

8. The method of claim 1, wherein a channel hopping protocol of the secondary TSCH network switches frequencies at a same rate as a channel hopping protocol of the primary TSCH network switches frequencies.

9. The method of claim 1, further comprising:
    in response to determining that the first node and the second node are only configured to communicate on the primary TSCH network, transmitting the unicast message during a primary portion of the timeslot, wherein the timeslot is a contention access period timeslot for the primary TSCH network.

10. A time-slotted channel hopping (TSCH) network node, comprising:
    a transceiver;
    a memory; and
    a processor communicatively coupled to the transceiver and the memory, wherein the processor is configured to implement a protocol stack including:
        a media access control (MAC) layer having a MAC address to communicate on a primary TSCH network, wherein the MAC address defines addressing for the primary TSCH network and a secondary TSCH network,
    wherein the processor is further configured to:
        refer to a neighbor table stored in the memory of the TSCH network node to obtain the MAC address of a second TSCH network node,
        after a delay period of a first portion of a primary TSCH network timeslot cause the transceiver of the TSCH network node to:
        synchronize to a channel hopping sequence and frequency of the secondary TSCH network, and
        transmit a unicast frame to the second TSCH network node on the secondary TSCH network during a second portion of the primary TSCH network timeslot.

11. The TSCH network node of claim 10, wherein the processor is configured to determine the delay period as a macTsTxOffset time period plus an additional macTsC-CAOffset time period plus a macTsRxWait time period,
wherein the macTsTxOffset time period is a period of time a sender node waits to transmit a frame to make communication possible when the sender node is ahead in time of a receiver node, the additional macTsC-CAOffset time period is a period of time to allow clear channel assessment after the macTsTxOffset time period, and the macTsRxWait time period is a period of time the receiver node waits to start receiving the frame after the receiver node starts listening to a transmission medium.

12. The TSCH network node of claim 10, wherein the MAC address of the second TSCH network node is associated with the channel hopping sequence of the second TSCH network node on the secondary TSCH network, and
wherein the TSCH network node determines a channel on the secondary TSCH network to transmit the unicast frame to the second TSCH network node based the channel hopping sequence associated with the MAC address of the second TSCH network node on the secondary TSCH network contained in the neighbor table stored in the memory of the TSCH network node.

13. The TSCH network node of claim 10, the processor is configured to:
prior to transmitting the unicast frame to the second TSCH network node, receive a communication from the second TSCH network node over the primary TSCH network, wherein the communication contains a capability information element indicating that the second TSCH network node supports communication over the secondary TSCH network, and
store an indication corresponding to the capability information element in an entry associated with the second TSCH network node in the neighbor table in the memory of the TSCH network node.

14. The TSCH network node of claim 10, wherein the processor is configured to cause the transceiver to broadcast a communication over the primary TSCH network including a capability information element indicating that the TSCH network node supports communication over the secondary TSCH network.

15. A system comprising:
a plurality of time-slotted channel hopping (TSCH) nodes communicatively coupled to each other on a primary TSCH network, each of the TSCH nodes of the plurality of TSCH nodes including:
a transceiver;
a memory; and
a processor communicatively coupled to the transceiver and the memory, wherein the processor is configured to implement a protocol stack including:
a media access control (MAC) layer having a MAC address to communicate on the primary TSCH network, wherein the MAC address defines addressing for the primary TSCH network and a secondary TSCH network,
wherein the processor of a first TSCH node of the plurality of TSCH nodes is further configured to:
cause the transceiver of the first TSCH node to receive a first communication from a second TSCH node of the plurality of TSCH nodes over the primary TSCH network containing a capability information element indicating that the second TSCH node supports communication over the secondary TSCH network,
cause the transceiver of the first TSCH node to synchronize to a channel hopping sequence and frequency of the secondary TSCH network, and
after a delay period of a first portion of a primary TSCH network timeslot, cause the transceiver of the first TSCH node to transmit a unicast frame to the second TSCH node on the secondary TSCH network during a second portion of the primary TSCH network timeslot.

16. The system of claim 15, wherein the processor of each of the TSCH nodes of the plurality of TSCH nodes is configured to store in a neighbor table indications corresponding to the capability information element received in communications from other TSCH nodes,
wherein the capability information element indicates that the other TSCH nodes support communication over the secondary TSCH network.

17. The system of claim 15, wherein the processor of each of the TSCH nodes of the plurality of TSCH nodes is configured to cause the transceiver to broadcast a second communication over the primary TSCH network including the capability information element indicating that the TSCH node supports communication over the secondary TSCH network.

18. The system of claim 15, wherein delaying transmission for the delay period causes the transceiver of the first TSCH node to transmit the unicast frame after a primary portion of the primary TSCH timeslot elapses.

19. The system of claim 15, wherein the processor of the first TSCH node of the plurality of TSCH nodes is configured to determine the delay period as a macTsTxOffset time period plus an additional macTsCCAOffset time period plus a macTsRxWait time period,
wherein the macTsTxOffset time period is a period of time a sender node waits to transmit a frame to make communication possible when the sender node is ahead in time of a receiver node, the additional macTsC-CAOffset time period is a period of time to allow clear channel assessment after the macTsTxOffset time period, and the macTsRxWait time period is a period of time the receiver node waits to start receiving the frame after the receiver node starts listening to a transmission medium.

20. The system of claim 15, wherein the MAC address of the second TSCH node is associated with the channel hopping sequence of the second TSCH node on the secondary TSCH network, and
wherein the first TSCH node determines a channel on the secondary TSCH network to transmit the unicast frame to the second TSCH node based the channel hopping sequence associated with the MAC address of the second TSCH node contained in a neighbor table stored in the memory of the first TSCH node.

21. The system of claim 15, wherein a primary portion of the primary TSCH timeslot is prioritized for transmitting broadcast/multicast frames.

22. The system of claim 15, wherein a channel hopping protocol of the secondary TSCH network switches frequencies less often than a channel hopping protocol of the primary TSCH network switches frequencies.

23. The system of claim 15, wherein a channel hopping protocol of the secondary TSCH network switches frequencies at a same rate as a channel hopping protocol of the primary TSCH network switches frequencies.

* * * * *